March 14, 1939.  I. BJORNSON  2,150,486
CHILD'S BLANKET
Filed Feb. 18, 1935  4 Sheets-Sheet 1
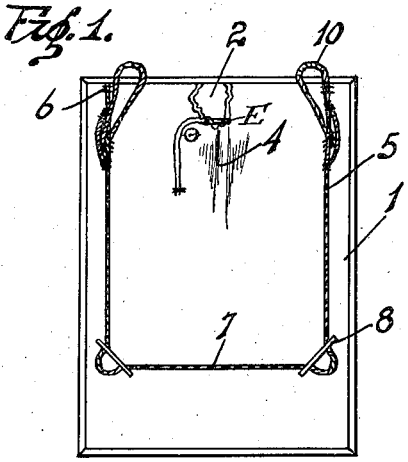
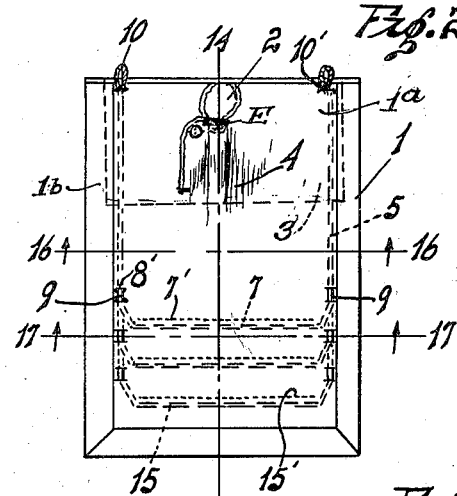
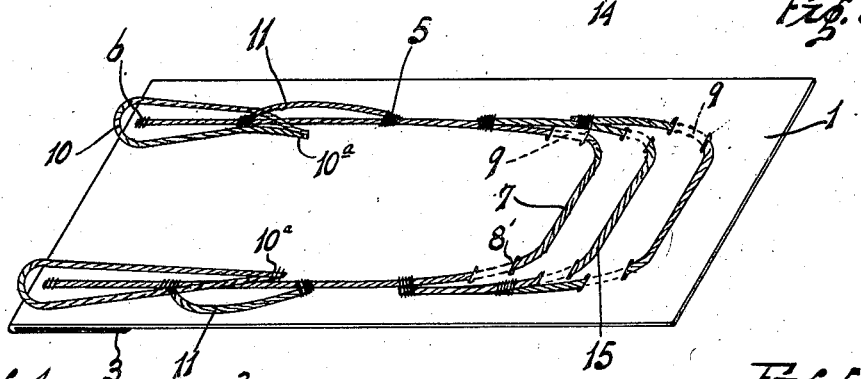
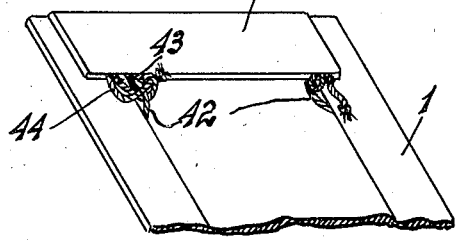
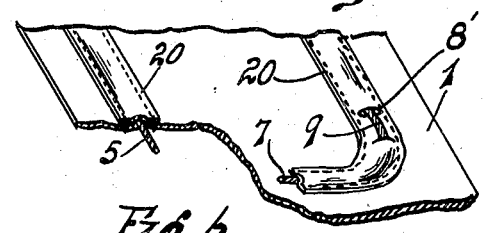
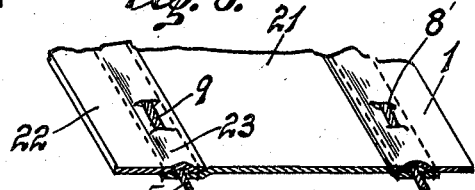
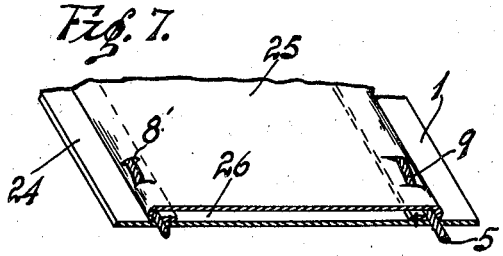
INVENTOR.
INGVARD BJORNSON.
BY
ATTORNEY.

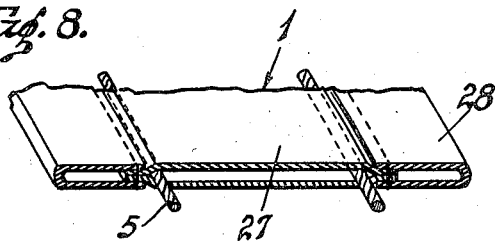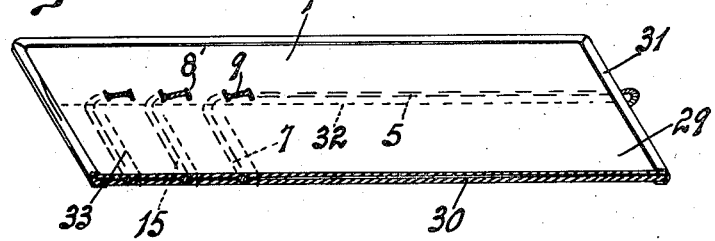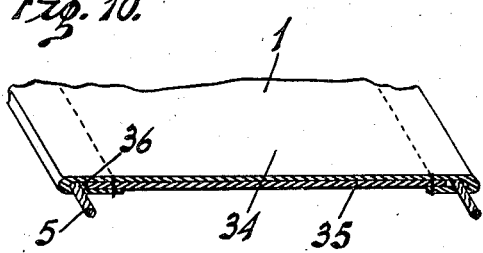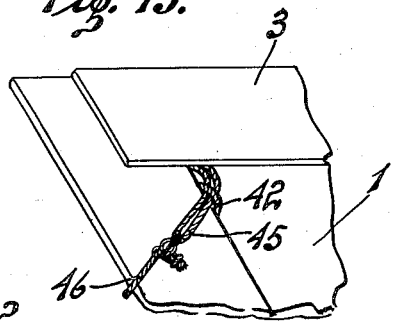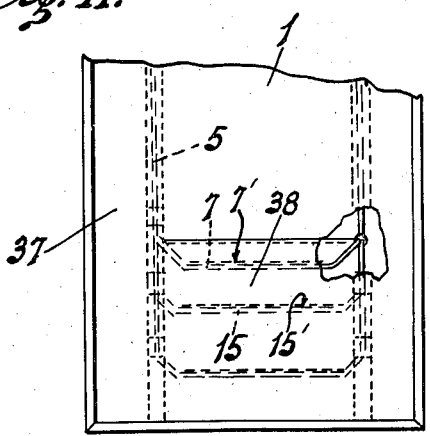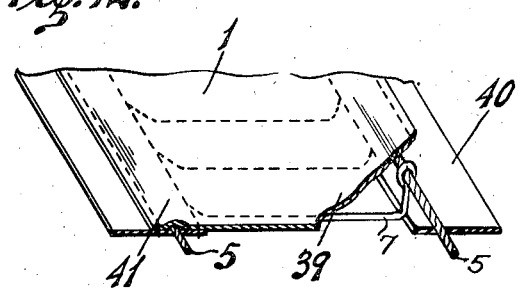

March 14, 1939.  I. BJORNSON  2,150,486
CHILD'S BLANKET
Filed Feb. 18, 1935  4 Sheets-Sheet 3
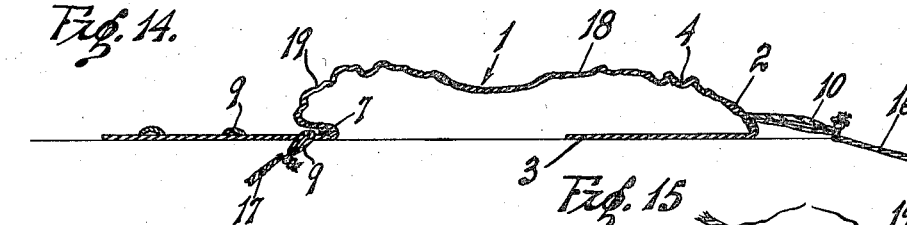
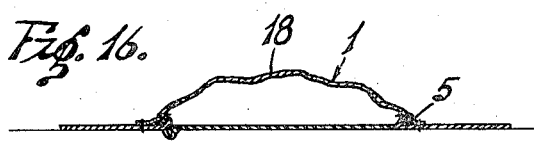
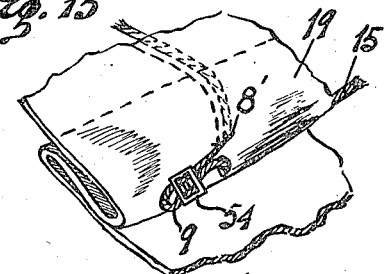
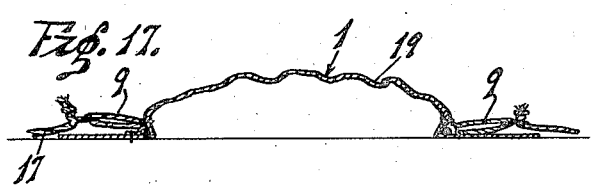
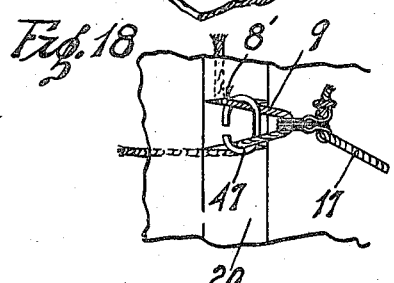
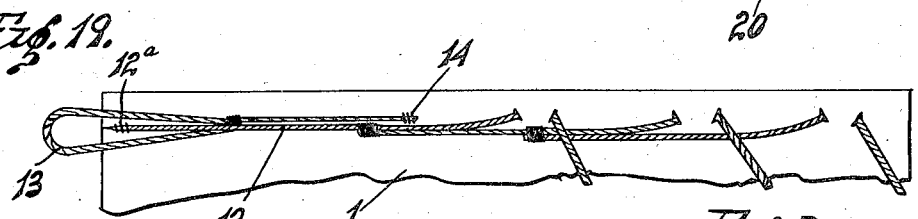
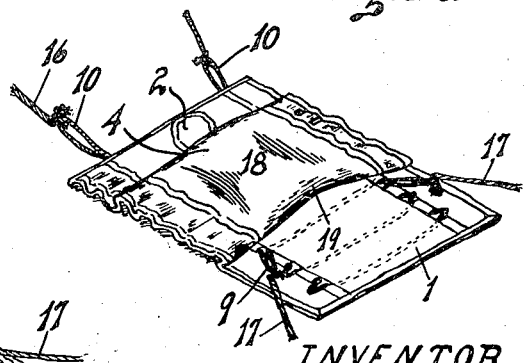
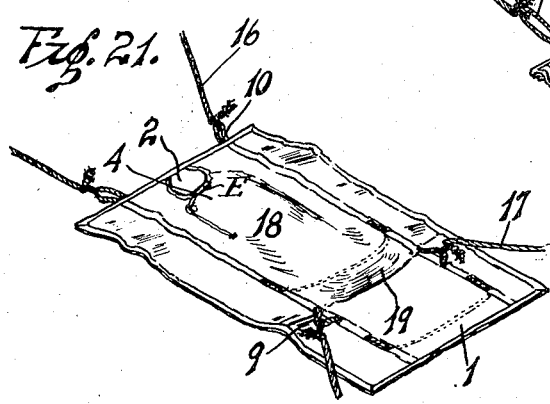
INVENTOR.
INGVARD BJORNSON.
BY
ATTORNEY.

March 14, 1939.  I. BJORNSON  2,150,486
CHILD'S BLANKET
Filed Feb. 18, 1935  4 Sheets-Sheet 4
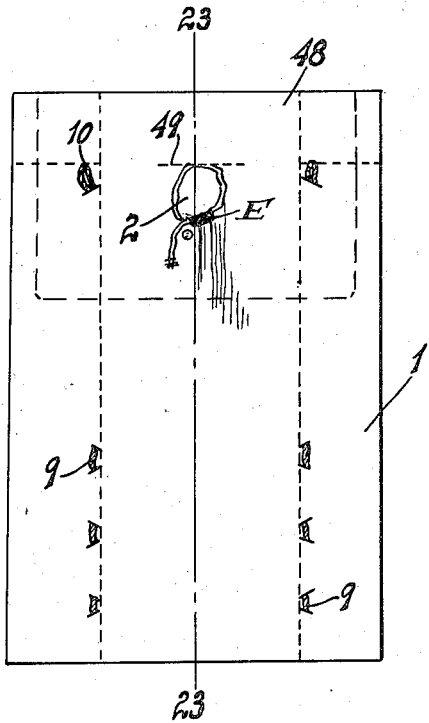
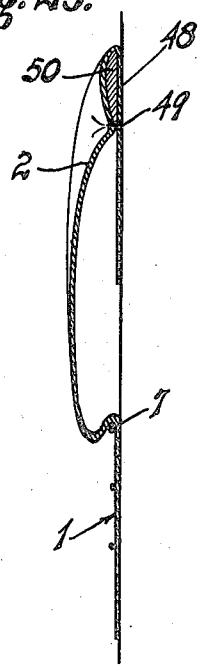
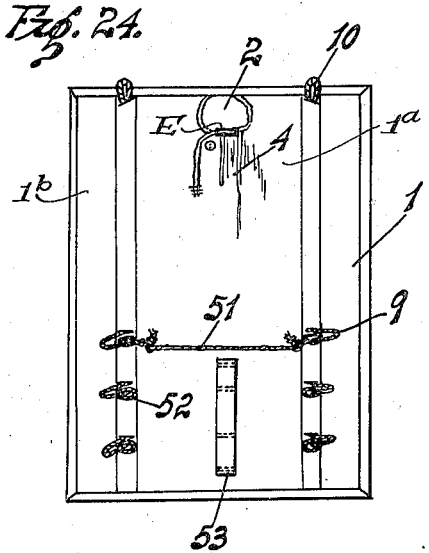
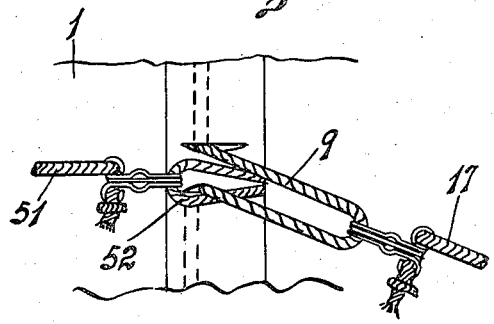
INVENTOR.
INGVARD BJORNSON.
BY
ATTORNEY.

Patented Mar. 14, 1939

2,150,486

UNITED STATES PATENT OFFICE 2,150,486

CHILD'S BLANKET

Ingvard Bjornson, Sunset Beach, Calif.; Clifford Albert Neil, owner by decree of Court Application February 18, 1935, Serial No. 7,028

9 Claims. (Cl. 5—334)

This invention relates to a novel, useful and original way of constructing and of holding and automatically controlling and localizing the size, shape, form, and other special features combined in a child's blanket.

My blanket provides for the comfort and safety of the child by reason of the blanket's localized and controlled fullness whereby room is provided where desired, this room being for a definite purpose.

My blanket is also unique in that it is adjustable to the child, as the child grows.

My blanket further provides a novel means of taking the principal strains off of the blanket itself and transferring these strains to the holding means, and at the same time, avoiding any undue restraint on the child while it may be exercising or moving about.

These advantages are all accomplished automatically by the simple act of securing the blanket to the bed or crib.

An object of my invention is to provide a blanket in which tension—when applied to the holding means—will create and hold fullnesses, shapes and forms where desired, in the blanket.

Another object is to provide a device for holding the blanket in place while controlling and localizing the shape, size and form of the blanket, combined with a holding means upon the blanket, or secured to the blanket, or enclosed within the blanket.

Still another object is to provide a blanket in which a special controlled fullness is provided over the feet, the fullness being both transverse and longitudinal, and acting as a pocket for the feet of the child when they are resting in the blanket, thus insuring warmth—and at the same time—providing extra room for movement of the feet and body without exposing the occupant.

A further object is to provide a blanket in which a stop is provided for the occupant's feet, thus making it difficult to slide the feet downwardly, and therefore preventing the occupant from slipping down in the blanket. This avoids having the occupant restrained by his neck, as in blankets heretofore in use, as well as preventing the feet from slipping out from under the covers.

Another object is to provide a blanket having a foot fold and stop which are adapted to be moved downwardly in the blanket as the occupant grows in length. The fold is also self-adjusting to the exact length of the child under any given condition.

A feature of my blanket is that it can be adjusted easily and quickly for longitudinal or transverse fullness, as the parent may deem necessary.

A further feature is to provide a blanket which has channels or compartments formed therein, in which the holding means is mounted out of sight, and also thereby preventing entangling of the holding means.

Another feature of my invention is to provide a blanket which will slide downwardly from the top and which also has a neck opening below the top sufficiently to provide a fold under the head of the child, which fold is adapted to admit and contain a pillow, which will then move up or down or sidewise with the occupant, and will still remain directly beneath the head of the occupant.

Other objects, advantages and features of invention may appear from the accompanying drawings, the subjoined detailed description, and the appended claims.

Figure 1 is a diagrammatic view of the holding and adjusting cord on the blanket.

Figure 2 is a top plan view of my blanket showing the holding and adjusting cords.

Figure 3 is a diagrammatic perspective view of the holding and adjusting cords, as mounted in, or on a blanket.

Figure 4 is a fragmentary perspective view of the upper reverse side of the blanket.

Figure 5 is a fragmentary perspective view of one form of channel for the cords.

Figure 6 is a fragmentary perspective view of another type of channel for the cords.

Figure 7 is a fragmentary perspective view of still another type of channel or compartment for the cords.

Figure 8 is a fragmentary transverse sectional view of still another type of compartment for the cords.

Figure 9 is a longitudinal sectional view in perspective, of another method of forming channels in a blanket.

Figure 10 is a fragmentary transverse sectional view in perspective, of another type of blanket construction showing the channels.

Figure 11 is a fragmentary plan view of the bottom side of a blanket showing a covering piece for the foot cords.

Figure 12 is a fragmentary transverse sectional view in perspective, of another type of blanket construction showing the cord channels.

Figure 13 is a fragmentary perspective view of the under side of the blanket showing a method of holding down the under piece of the blanket to create a fullness, and to hold the under portion taut.

Figure 14 is a sectional view taken on line 14—14 of Fig. 2.

Figure 15 is a fragmentary perspective view of a portion of the blanket showing the foot fold and cord.

Figure 16 is a sectional view taken on line 16—16 of Fig. 2.

Figure 17 is a sectional view taken on line 17—17 of Fig. 2.

Figure 18 is a fragmentary plan view of one of the foot cords partly pulled out and with a control ring encircling the loop.

Figure 19 is a fragmentary diagrammatic plan view of another type of cord arrangement.

Figure 20 is a perspective view of a blanket in use and with the upper edge moved downwardly.

Figure 21 is a perspective view of a blanket in normal use.

Figure 22 is a top plan view of a modified form of blanket showing a pillow retaining means.

Figure 23 is a sectional view taken on line 23—23 of Fig. 22.

Figure 24 is a top plan view of a modified type of cord construction showing a foot cord on the outside of the blanket.

Figure 25 is an enlarged plan view of the control cord and the foot cord, as shown in Fig. 24.

My blanket comprises in general, the principle of a holding means, such as a cord or cords lying upon or secured to the blanket, or within the blanket, combined with a means for controlling the blanket with regard to localizing its shape, form and size, as well as other features. The means for controlling the shape or size is effected by a band or cord on the blanket, or combined with the blanket in such a way that the tension caused by securing the cords to the crib will create the desired changes in form and shape of the blanket.

The cords, which are attached to, and mounted within the blanket, when pulled outwardly by the user, pull against each other in such a way as to pull the blanket downwardly from the top and upwardly from the bottom, to create fullness between the points of attachment. There is a special fullness at the upper part of the blanket, and a plurality of foot fullnesses, as well as a general transverse and longitudinal fullness thruout the blanket. The cords traverse most of the length of the blanket, starting at or near the top at each side of the neck opening and adjacent the side edges of the blanket. These cords then extend downwardly, and across the blanket at about the location of the feet of the occupant.

The transverse foot cords are spaced apart adjacent the lower end of the blanket and any one of these cords will create a foot fullness when it is pulled upwardly and attached to the bed. All cords are preferably concealed in seams, compartments or channels formed in the blanket, and these seams give the blanket added strength.

My blanket comprises a rectangular piece of material 1 suitable in size for a crib covering, and generally made in three sections—a wide central strip 1ᵃ with two narrow side strips 2ᶜ—substantially as shown in Figs. 2 and 24. These strips of material may be single, double, or multiple, or they may be of different thicknesses or layers in different parts of the blanket to provide warmth and strength, and channels or compartments to hold and hide the cords, as will be further described.

The blanket is provided with a U-shaped neck opening 2 at the upper end thereof. The opening is preferably wider than is needed for the neck of the child. The upper rectangular piece 1 is then sewed to a narrower bottom fold 3. The bottom fold is about one-quarter—more or less—as long as the upper piece 1. In stitching the upper piece to the bottom fold, the neck opening is crowded in at the top edge, making a fullness over the central portion of the blanket, as shown at 4. An elastic E is stitched across the front of the neck opening, causing it to pucker and thus fit more tightly around the neck, at the same time being yieldable to tension. The neck opening also has a slit to provide more room when opened. The neck opening slit is also provided with a side flap (the flap being held in closed position) or other suitable fastening means.

To create the various fullnesses in different parts of the blanket, I provide a cord 5 which is diagrammatically shown in Figs. 1 and 3. The cord extends upon, or within the blanket in a substantially U-shaped path, and the upper ends of the cord are attached to the blanket, as shown at 6. At the lower end, the cord extends transversely of the blanket, as shown at 7. At each lower corner the cord is adjustably mounted on to the blanket by suitable means, such as a tab 8 (see Fig. 1), or by passing the cord thru eyelets 8' in the blanket to create outside loops 9. This latter construction of the eyelets or openings in the blanket is shown in Figs. 2 to 7, inclusive.

The cord loop 10 projects from the upper edge of the blanket thru two eyelets 10' (see Fig. 2), in which the loop slides. The loop 10 is attached to the blanket at 10A, and by pulling upwardly on the loop 10 and fastening it to the crib, the blanket will be pulled and held upwardly a corresponding distance at 10A, thus forming a fullness in the blanket over the chest and arms of the occupant. The loop 10 engages with the loop 11, and when the cord 5 is pulled downwardly at 9, the top of the blanket is held in this position at 6. The top of the loop 11 meets the bottom of the loop 10 at 10A and the two loops engage to prevent further retraction at the top of the blanket, as far as the cords are concerned. In this way, the upper edge of the blanket cannot be moved upwardly by the child as said edge is restrained by the cord 5. However, the occupant can pull the top of the blanket downwardly with respect to the loop 10 a considerable distance, thus preventing tension on the neck should the occupant slide down in the blanket. Obviously, the loop 10 and the cord 5 can be on the outside of the blanket, as well as housed within the blanket.

If I wish to prevent the upper edge of the blanket from sliding down with the child, a construction is employed, such as shown in Fig. 19. A cord 12 is secured to the blanket at 12A adjacent the upper edge of the blanket. An elongated loop 13 is attached to the blanket at the lower end of said loop, as shown at 14. The loop 13 encircles the cord 12. Thus, when a pull is placed on loop 13, the required fullness is created in the blanket by pulling the blanket up at 14. The bottom of the loop 13 engages the cord 12 at 12A, the point where it is secured to the blanket, and holds the top of the blanket against upward or downward movement when the cord is secured to the bed at the loop 9.

A plurality of additional transverse foot cords 15 are successively secured to the cord 5, and as the child grows, the next successive foot cord is utilized. That is, the cord which is to be used is held taut by securing it to the bed, as previously described.

When in use, the two upper loops 10 are pulled upwardly, and slide thru slots 10' as shown in Fig. 2 in the blanket, and are attached to the crib or bed by means of cords 16, as shown in Figs. 20 and 21. Since the loop 10 is attached to the blanket at 10ª, the blanket is pulled upwardly with the loop 10 to create a special fullness in the upper part of the blanket. The loop 11 engages the loop 10 and controls how far upwardly the loop 10 may be pulled, and consequently, controls the amount of chest and arm fullness that is created and held in the top portion of the blanket. When the cord 5 is attached to the bed at 9, the fullness created by pulling out 10 becomes fixed against upward movement by virtue of the taut engagement of the loop 11 and the loop 10 at 10ª.

A pair of opposite loops 9 are pulled outwardly, and are attached to the crib by tapes or cords.

The foot cords 7 and 15 extend downwardly and then transversely from the loops 9, as shown in Figs. 2, 9 and 11. The cords are held from being pulled upwardly in the blanket, preferably by stitching at 7' and 15'. When the cord is pulled out at 9, the cord 7 (or 15) becomes taut on a horizontal transverse line between 9, 9, and thereby pulls the blanket upwardly along this line the distance between 9 and 7', and thereby moves the blanket upwardly along line 7', causing a fold to form in the blanket just above this line. It also pulls the blanket inwardly from the sides, making a fullness. In case the child needs more room or is actively kicking, the blanket is adapted to slide upwardly on the cord 7 an additional distance or until the next lower stitching 15' in the blanket is pulled up to and engages the cord 7, at which point the blanket is restrained from further expansion.

When these operations have been performed, the following fullnesses are created in the blanket: A longitudinal and transverse fullness 18 is formed because of the upward and downward pull of the cords 5 and 10. A foot fold 19 and a transverse fullness are formed in the fold by drawing the loops 9 outwardly and downwardly. An additional fullness is created over the chest of the child, while the foot fold 19 is created at the feet, permitting adequate movement and giving more warmth.

The transverse foot stops 7 or 15 are held taut by reason of the tapes 17, and the child, in kicking, will therefore hold itself up in the blanket and there will be no strain on its neck.

It will be noted from the foregoing description that the blanket is held adjacent the sides of the longitudinal center thereof, (10A, in Fig. 3, and 14 in Fig. 19); and also adjacent the lower end thereof 9, the hold-down means—i. e., the cord—being spaced inwardly from the side edges of the blanket.

The cord 5 is preferably mounted within the blanket for greater ease in handling the washing, and also to prevent tangling of the cord. For this purpose, various channels, compartments or seams are formed in the blanket thru which the cord 5 extends.

In Fig 5, there is shown a blanket of a single thickness, and to the upper or lower surface, I stitch tape 20, thus providing a channel, substantially as shown.

In Fig. 6, the central portion 21 of the blanket is also of single thickness, and to both edges of the center portion are stitched relatively narrow strips 22. The longitudinal stitching is spaced apart so as to provide a channel 23 in which the cord is mounted.

In Fig. 7, the blanket is of double thickness at the center to provide greater warmth, and the lower strip 24 is preferably the full width of the blanket. A second strip 25 is stitched onto the top or bottom of the strip 24, thus providing a compartment 26 in which the cords are mounted.

In Fig. 8, the center portion 27 of the blanket is of double thickness, as are also the side pieces 28 which are stitched to the center portion 27 substantially as shown, thus providing a compartment either at the center of the blanket or at the outer edges thereof, in which the cord 5 can be placed. The edge strips are preferably folded over so that no unfinished edges appear at the sides of the blanket.

In Fig. 9, the blanket is formed by two superimposed strips of material 29 and 30 which are stitched together and bound along the unfinished edges by binding material 31. The compartments for the cord 5 are formed by stitching both longitudinally and transversely, as shown at 32 and 33.

In Fig. 10, a comparatively wide strip of material 34 is superimposed upon a narrower strip 35. The side edges of the strip 34 are turned under inwardly and are stitched to the strip 35 adjacent the side edges of the blanket. A compartment 36 is thus provided for the cord.

In Fig. 11, the blanket is formed by a single thickness of material 37, and the transverse foot cords 7 are covered by a piece of material 38 which is stitched to the under side of the blanket 37. The strip of material 38 is stitched to the under side of the blanket 37 along all four edges of the piece 38. That is, it is stitched along the line 38' along the bottom edge of the blanket and also along the side at each of the longitudinal cord channels, thus covering the foot cords.

In Fig. 12, the center portion of the blanket 39 is of single thickness, as are also the side strips 40. These parts are stitched together by spaced stitching so as to provide channels 41 for the cords.

In Figs. 4 and 13, the under fold 3 of the blanket may be connected to the upper covering part of the blanket so as to create a fullness in the upper part by the following arrangement: A loop 42 is attached to the under side of the blanket 1 adjacent the side edges thereof, and somewhat below the under fold. A loop 43 is secured to the under fold 3 adjacent each side thereof. The loop 42 can be passed thru the loop 43, and they can be secured together and held in this position by passing the loop 43 thru the loop 42 and then passing the knot on the cord 44 thru the loop 43. When under tension, the loop 43 becomes constricted by the loop 42 and, consequently, grips the knot on 44, thus fastening 42 and 43 together, creating a held fullness in the covering part of the blanket, and holding the under fold taut.

In Fig. 13, the loop 45 is longer than the loop 43 and is pulled thru the loop 42, substantially as shown. A cord 46 is then attached to the loop 45 and the cord is secured to the crib.

As shown in Fig. 18, a means is provided whereby the loop 9 is prevented from pulling against the eyelets 8'. A ring 47 outside of an adjacent the channel 20 encircles the cord loop so that when the loop is attached to the crib by means of the cord 17, the tendency of the loop to spread will be restrained by the ring.

In Fig. 22, a fold 48 is provided in the blanket above the neck opening 2. Stitching, or separable fastening 49 extends transversely of the blanket immediately above the neck opening 2. A pillow 50 is placed in the fold 48 and it will be evident that as the blanket moves either up or down, or sidewise, the pillow will follow the movement and remain under the head of the child. The top edge of the blanket is retractable relative to the cord 10, as previously described.

In Fig. 24, the foot cord 51 is on the outside of the blanket, and is shorter than the distance between the cord channels, and it is secured to loops 52 on each side of the blanket. These loops are spaced apart adjacent the lower edge of the blanket so as to enable the foot cord 21 to be moved downwardly as the child grows. The loops 52 are stitched into the blanket and extend under or thru the loops 9, thus preventing the loops 9 from being retracted into the channel. The loops 52 also serve to hook the ends of the foot cord 51, thus enabling the foot cord to be moved downwardly from time to time, as the child grows.

In order to create a foot fold, I may stitch a tape 53 in the center of the blanket, said tape being provided with transverse openings thru which the cord 51 may be threaded, these openings thru the tape being below the horizontal line between the loops 52 so that when the foot cord is threaded under the tape and held taut, the lower portion of the blanket will be moved upwardly, thus creating a fullness similar to the foot fold 19.

If desired, the cord 17 may be attached to a slidable buckle 54 on the loop 9 (see Fig. 15) instead of directly attaching the cord to the loop. This buckle can be fastened at any point on the loop 9 without adjusting the tape or cord 17. It can also be pulled directly to the side of the cord channel in the blanket and permits pulling out and holding an extra amount of cord in the loop 9, or pulling out an extra amount of foot cord 7 to create additional transverse fullness, or an extra amount of cord 5 to create additional longitudinal fullness. Loop 52 encircles the loop 9 to prevent 9 being retracted into the channel. Loops 9 and 10 pulling against each other create fullnesses, as shown in Figs. 15, 20 and 21.

Having described my invention, I claim:

1. In a blanket, a cord mounted in the blanket, said cord extending along three sides of the blanket, said blanket having slits therein adjacent the bottom thereof, said cord projecting out of the slits, a loop connected to the upper end of each of the cords, said loops projecting out of the blanket, adjustable gripping means slidably mounted on said loops and on the cord projecting from the slits, and a plurality of transverse foot cords arranged in spaced relation, said transverse foot cords being attached at the ends thereof to said cord on opposite sides of the blanket to the first named cord.

2. A child's sleeping blanket including a blanket body having a chest covering portion, and a leg covering portion, the blanket body comprising superimposed members secured together adjacent their edges, and means for holding the blanket body to cover a child, said means comprising spaced cords adapted to be connected with relatively fixed objects and entered between the members from the head end of the body to pass thru its chest covering portion, means fixing the cords to the body at points spaced from its head end whereby the chest covering portion may shift longitudinally on the cords, means securing the members together at longitudinally spaced points in the leg covering portion to form a channel therein, a cord having its ends connected with the said cords and extending along the longitudinal edge parts of the body between the members and then passing transversely thru the channel, and means for securing the parts of the said cord at the opposite ends of the channel to relatively fixed objects whereby the cord holds the edge parts of the body against upward displacement, the channel and cord being related to allow shifting of the leg covering portion on said cord whereby there may be fullness in said portion.

3. A child's blanket comprising a body having longitudinally spaced transverse tunnels in its foot portion, a flexible element extending thru each tunnel, and means for tensioning any one of the elements so that the selected element holds down the body at its tunnel whereby the lower limit of the occupied portion of the body may be at a selected tunnel.

4. A child's blanket comprising a body having longitudinally spaced transverse tunnels, a cord element including parts extending along the side edge portions of the body and adapted to be tensioned to hold down said edge portions, and cords connected with said side parts of the element and extending thru the tunnels and means for tensioning the said parts and any one of the cords to hold down the said edge portions and the body at the tunnel receiving the selected cord.

5. A child's blanket comprising a blanket body, longitudinally spaced sets of transversely aligned cord receiving means at the edge parts of the foot portion of the body, a cord adapted to be removably engaged with a selected pair of aligned means and to extend transversely across the body, and means for tensioning the cord to hold the body against vertical movement at a selected transverse line.

6. In a child's sleeping blanket, the blanket body, an arrangement of flexible elements at each side thereof, said elements being attached to said body at a point inwardly from a side thereof and at a distance from the head end thereof, said elements extending beyond the head end of the blanket and adapted for attachment to the head of a crib, a cord extending parallel to the same side of the blanket and attached to said blanket near the head end thereof, adjacent said elements, means slidably connecting said cord with the said body toward the foot end of the body whereby when the elements and the cord are pulled in opposite directions, a fullness extending transversely of the body is produced and means connected with the cord and engageable with the elements whereby the extent of such relative movement is limited.

7. In a child's sleeping blanket, the blanket body, an arrangement of flexible elements at each side thereof, said elements being attached to said body at a point inwardly from a side thereof and at a distance from the head end thereof, said elements extending beyond the head end of the blanket and adapted for attachment to the head of a crib, a cord extending parallel to the same side of the blanket and attached to said blanket near the head end thereof, adjacent said elements, means slidably connecting said cord with the said body toward the foot end of the body whereby when the elements and the cord are pulled in opposite directions, a fullness extending transversely of the body is produced and means connected with the cord and engageable with the elements whereby the extent of such relative movement is limited, a freely slidable and flexible element forming a foot cord, said foot cord being positioned at the foot end of the blanket body, the ends of said foot cord being attached to the first named cord.

8. In a blanket, a series of longitudinally disposed fastening means adjacent the lower side edges of the blanket and a transverse foot cord adapted to be detachably and selectively secured at both ends to said fastening means.

9. In a blanket body, a series of longitudinally disposed fastening means adjacent the lower side edges of the body, a transverse foot cord adapted to be detachably secured at both ends to said fastening means, a pair of cords extending longitudinally of the blanket body, said said cords being attached to said blanket body at a point inwardly from the side edges thereof, said cord slidably extending beyond the head end of the blanket and adapted for attachment to the head of a crib, a second cord extending parallel to the side edges of the blanket and attached to said body near the head end thereof, adjacent the first named cord, means slidably connecting said second cord with said blanket body toward the foot end of the body, flexible means slackly connecting the two cords whereby when the first and second mentioned cords are pulled outwardly in opposite directions, longitudinally of the blanket, a fullness is produced in the blanket and flexible means limiting relative longitudinal movement of the cords with respect to each other, whereby further movements of the cords in opposite directions is prevented.

INGVARD BJORNSON.